United States Patent
Jin et al.

(10) Patent No.: US 10,911,438 B2
(45) Date of Patent: Feb. 2, 2021

(54) SECURE DETECTION AND MANAGEMENT OF COMPROMISED CREDENTIALS USING A SALT AND A SET MODEL

(71) Applicant: Shape Security, Inc., Mountain View, CA (US)

(72) Inventors: Zhipu Jin, Mountain View, CA (US); Gautam Agrawal, Mountain View, CA (US); Daniel G. Moen, Sunnyvale, CA (US); Weiguo Liang, Mountain View, CA (US); Xingang Wang, Mountain View, CA (US)

(73) Assignee: Shape Security, Inc., Santa Clara, CA (US)

( * ) Notice: Subject to any disclaimer, the term of this patent is extended or adjusted under 35 U.S.C. 154(b) by 260 days.

(21) Appl. No.: 16/025,918

(22) Filed: Jul. 2, 2018

(65) Prior Publication Data

US 2019/0007387 A1    Jan. 3, 2019

Related U.S. Application Data

(60) Provisional application No. 62/550,532, filed on Aug. 25, 2017, provisional application No. 62/528,035, filed on Jul. 1, 2017.

(51) Int. Cl.
| | |
|---|---|
| *H04L 29/06* | (2006.01) |
| *H04L 9/06* | (2006.01) |
| *G06F 16/951* | (2019.01) |
| *H04L 9/08* | (2006.01) |
| *H04L 9/32* | (2006.01) |

(52) U.S. Cl.
CPC .......... *H04L 63/083* (2013.01); *G06F 16/951* (2019.01); *H04L 9/0891* (2013.01); *H04L 9/3226* (2013.01); *H04L 9/3239* (2013.01); *H04L 63/20* (2013.01)

(58) Field of Classification Search
CPC ... H04L 63/083; H04L 9/0891; H04L 9/3226; H04L 9/3239; H04L 63/20; G06F 16/951
USPC .......................................................... 726/6
See application file for complete search history.

(56) References Cited

U.S. PATENT DOCUMENTS

| | | | |
|---|---|---|---|
| 9,232,338 B1 * | 1/2016 | Henry | H04W 4/021 |
| 10,262,129 B1 * | 4/2019 | Gupta | G06F 21/31 |
| 10,523,686 B1 * | 12/2019 | Mehta | H04L 63/083 |

(Continued)

*Primary Examiner* — Haresh N Patel
(74) *Attorney, Agent, or Firm* — Troutman Pepper Hamilton Sanders LLP (Rochester)

(57) ABSTRACT

Techniques are provided for secure detection and management of compromised credentials. A first candidate credential is received, comprising a first username and a first password, wherein the first candidate credential was sent in a first request from a first client computer to log in to a first server computer. A first salt associated with the first username in a salt database is obtained. A first hashed credential is generated based on the first password and the first salt. The first hashed credential is transmitted to a set model server computer, wherein the set model server computer is configured to maintain a set model that represents a set of spilled credentials, determine whether the first hashed credential is represented in the set model, and in response to determining that the first hashed credential is represented in the set model, performing additional processing on the first hashed credential.

32 Claims, 5 Drawing Sheets

(56) References Cited

U.S. PATENT DOCUMENTS

| | | | |
|---|---|---|---|
| 2006/0085643 A1* | 4/2006 | Philips | H04L 9/0844 |
| | | | 713/171 |
| 2012/0110469 A1* | 5/2012 | Magarshak | H04L 9/321 |
| | | | 715/747 |
| 2013/0007869 A1* | 1/2013 | Thomas | H04L 63/06 |
| | | | 726/9 |
| 2014/0201532 A1* | 7/2014 | Toy | H04L 9/3234 |
| | | | 713/171 |
| 2015/0089621 A1* | 3/2015 | Khalid | H04L 63/0807 |
| | | | 726/9 |
| 2016/0044034 A1* | 2/2016 | Spilman | G06F 21/6209 |
| | | | 713/181 |
| 2016/0262021 A1* | 9/2016 | Lee | H04L 9/085 |
| 2017/0033936 A1* | 2/2017 | Cidon | H04L 9/3271 |
| 2017/0063831 A1* | 3/2017 | Arnold | H04L 9/3226 |
| 2017/0111358 A1* | 4/2017 | Hall | H04L 63/126 |
| 2017/0346797 A1* | 11/2017 | Yedidi | H04L 63/14 |
| 2018/0006814 A1* | 1/2018 | Schroeder | H04L 9/3234 |
| 2018/0046796 A1* | 2/2018 | Wright | G06F 21/45 |
| 2018/0191688 A1* | 7/2018 | Chen | H04L 63/0428 |
| 2018/0241728 A1* | 8/2018 | Burgess | H04L 63/083 |
| 2018/0351747 A1* | 12/2018 | Spangemacher | G06F 21/31 |

\* cited by examiner

SECURE DETECTION AND MANAGEMENT OF COMPROMISED CREDENTIALS USING A SALT AND A SET MODEL

This application claims the benefit of Provisional Application Ser. No. 62/528,035, filed Jul. 1, 2017 and Provisional Application Ser. No. 62/550,532, filed Aug. 25, 2017, the entire contents of which is hereby incorporated by reference as if fully set forth herein, under 35 U.S.C. § 119(e).

FIELD OF THE DISCLOSURE

The present disclosure generally relates to security techniques applicable to client/server systems, and relates more specifically to secure detection and management of compromised credentials of clients with respect to one or more server systems.

BACKGROUND

A credential is an object associated with an account that is used to identify or authenticate the bearer as the owner or user of the account, such as an account associated with a particular domain or web site. A credential may comprise one or more of the following: username, password, certificate, identifier, or one or more other values that are associated with an account. For example, a credential may comprise a username and password associated with a bank account associated with a particular website.

A spilled credential is a credential that is acquired by an attacker or other unauthorized party. A published spilled credential is a credential obtained by an unauthorized party that is made available to one or more other unauthorized parties. For example, a set of spilled credentials may be distributed to other unauthorized parties as a database of usernames and passwords.

Unfortunately, users often reuse credentials for multiple accounts. For example, a user can use the same username and password for a bank account, email account, and a social media account. Accordingly, if an attacker acquires a spilled credential for an account on a particular website, then the attacker can attempt to use the spilled credential to gain unauthorized access to other accounts of the same user on other websites. Using spilled credentials associated with an account to attempt to gain authorized access to accounts on one or more other websites is called a credential stuffing attack.

Administrators for the other websites may be unable or unwilling to deal with the technical challenges of addressing the security risks involved in credential stuffing attacks. One way for a website to mitigate damage from credential stuffing attacks is to obtain published spilled credentials that are particular to the website and check the user accounts of the website to see if the spilled credentials are still being used for any user account. If an account's credentials matches a published spilled credential for the website, then the website can take remedial actions, such as resetting a password associated with the account, requiring a second factor authentication step, or other remedial actions.

However, attackers are known to implement credential stuffing attacks using spilled credentials that are not published. For example, an attacker that obtains a spilled credential may choose not to publish the spilled credential, or may use the spilled credential in various attacks before publishing the spilled credential.

Furthermore, published stuffed credentials for a first website may not be useful for detecting usage of the same spilled credential for another website. For example, many websites store one or more hashed credentials rather than storing the original credential. Thus, an attacker with a spilled credential for a first website may possess a username and a hashed password generated by the first website using one or more hashing parameters. Even if the user uses the same password for a second website, the second website may store a different hashed password for the user that is generated using different hashing parameters. Thus, comparing published spilled credentials for other websites does not provide a mechanism for evaluating the security of a website's accounts. Furthermore, a website may be unwilling to deal with the security, legal, and public-relation issues involved in buying or otherwise obtaining published spilled credentials for other websites.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The appended claims may serve as a summary of the invention.

Figure 1:
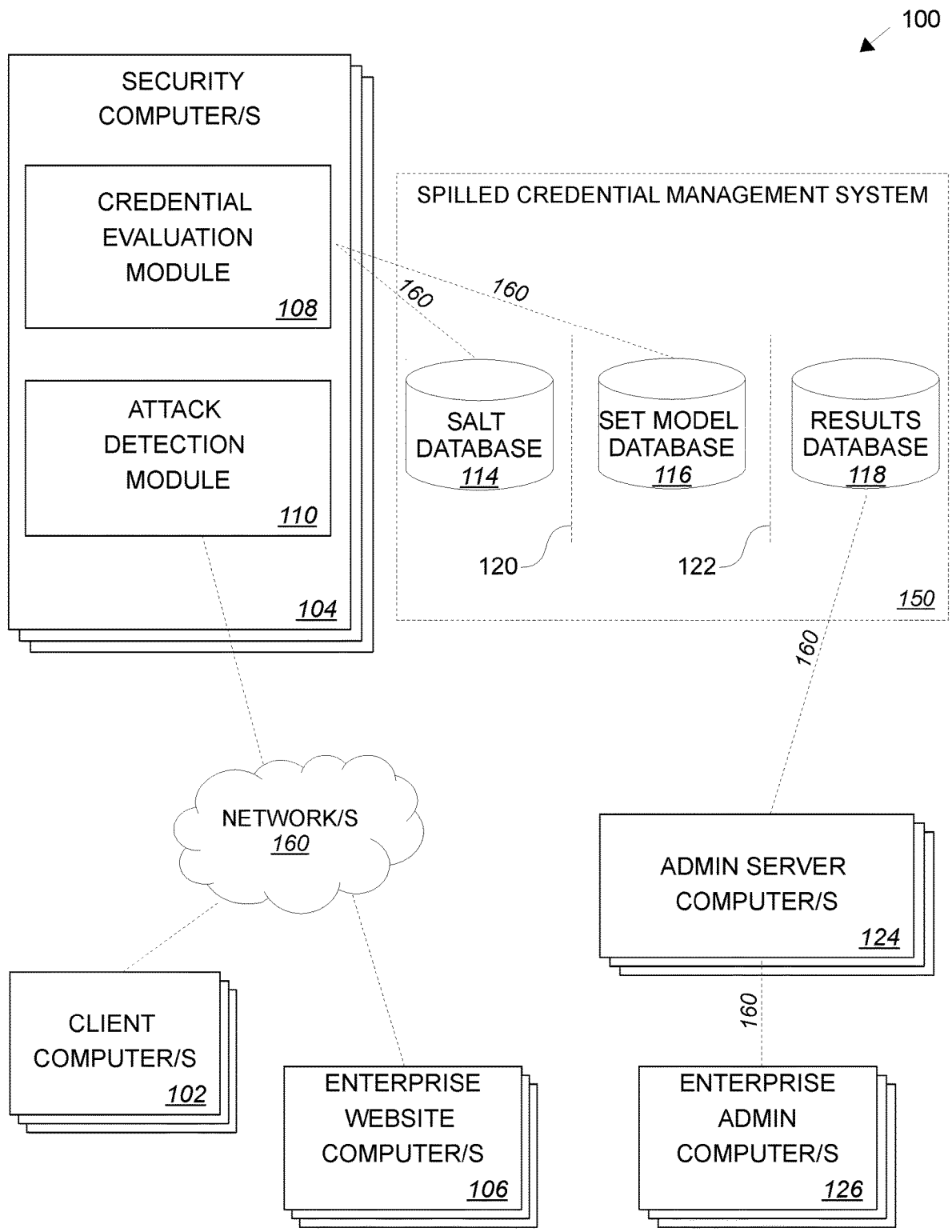
FIG. 1 illustrates a computer system for secure detection and management of spilled credentials in an example embodiment.

While each of the drawing figures illustrates a particular embodiment for purposes of illustrating a clear example, other embodiments may omit, add to, reorder, or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features, but do not preclude the presence or addition of one or more other features.

As used herein, the term "computer" may be one or more physical computers, virtual computers, or computing devices. As an example, a computer may be, or comprise, one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" herein may mean one or more computers, unless expressly stated otherwise.

As used herein, the term "application" refers to executable software that includes a set of instructions that, when executed by one or more processors, causes performance of a set of operations by one or more computers. An application may reside in the main memory of a device that executes the application. Instructions related to an application may reside on any suitable computer-readable medium, including volatile and non-volatile storage media, and may execute on any suitable processor.

As used herein, the term "module" may be software and/or hardware stored in, or coupled to, a memory and/or one or more processors on one or more computers. Additionally or alternatively, a module may comprise specialized circuitry. For example, a module, such as credential evaluation module 112 or attack detection module 114 in FIG. 1 and as discussed further herein, may be hardwired or persistently programmed to support a set of instructions to, and/or that are useful to, perform the functions discussed herein.

As used herein, the term "server" refers to a combination of integrated software components and an allocation of computational resources, such as memory, a computing device, and processes on the computing device for executing the integrated software components. The combination of the software and computational resources are dedicated to providing a particular type of function on behalf of clients of the server. A server may refer to either the combination of components on one or more computers, or the one or more computers (also referred to as "server computers"). A server computer may include multiple servers; that is, a server computer may provide a first set of functions on behalf of a first set of clients, and a second set of functions on behalf of a second set of clients.

As used herein, the term "website" may comprise one or more server computers configured to receive requests from one or more client computers, and respond by performing one or more operations or sending data to the one or more client computers. Each computer in the website may be communicatively coupled with one or more client computers or other computers over one or more computer networks. The term "website" may also refer to an entity that publishes the content presented by the one or more server computers of the website, which may be owned by the website/entity or a third party.

When a website performs an action, the action is performed by one or more computers of the website. For example, a website receiving a request may mean one or more server computers of the website receiving the request. When a system of one or more computers performs an action, the action is performed by the one or more computers of the system.

When a website is the indirect object of an action, the action is performed with respect to one or more server computers of the website. For example, sending data to a website means sending data to one or more computers of the website. When a system of one or more computers is the indirect object of an action, the action is performed with respect to one or more computers of the system.

As used herein, the term "web page" may comprise one or more sets of instructions or data. For example, a web page may be comprise HTML, CSS, or JavaScript that includes data, or defines one or more operations, for a browser that receives the web page to parse or perform. When a web page performs an action, a client computer that is processing the web page, or a module processing the web page on the client computer, performs the operation. The web page may perform the action in response to receiving one or more inputs from a user. For example, a web page sending a login request to a website may mean a browser processing a web page, receiving input from a user that includes a username and password, and in response, sending a request to login to an account on the website associated with the username.

General Overview

This document generally describes systems, methods, devices, and other techniques for secure detection and management of compromised credentials. A computer system of one or more computers maintains a set model that represents a set of credentials. The set model may represent a plurality of credentials without storing any individual credential, including any individual credential that has been hashed or otherwise encrypted.

When a candidate credential is sent in a request from a client computer to a website for authentication, the set model is used to determine whether the candidate credential is represented in the set model. When the candidate credential is represented in the set model, additional steps are taken, such as but not limited to logging the attempt to use the spilled credential, resetting the account password, requiring second factor authentication, or other responsive actions. The computer system may also detect a new spilled credential and update the set model to also represent the new spilled credential. For example, if it is determined that a request that includes a particular credential is part of an attack, the set model may be updated to represent the particular credential when the set model does not already represent the particular credential.

Isolation measures may be used to increase security, such as by storing username data separately from the set model. In some embodiments, the set model represents a set of hashed credentials generated by applying a hash function to a password, without storing any individual hashed credential or any username information. Username data may be stored in one or more separate databases that are isolated from the set model. Additional features and advantages are apparent from the specification and the drawings.

Hash Function

A hash function is any function that deterministically maps data to another value, referred to as a hash or hash value. The data may be of arbitrary size, while the hash value may be a fixed size. A hash function may produce a hash based on an input value and one or more operations or other values. Hashes can be used in many different computer-related applications, such as encryption and/or validation of data.

For purposes of illustrating a clear example, assume a hash function calculates an input value x modulo 9, or h(x)=x % 9. For an input value x=85, the hash generated by the hash function is four: h(85)=85% 9=4, or the remainder of 85 divided by 9. A hash function may produce the same hash value for different inputs, known as a collision. For example, an input value of 9004 will also produce a hash value of four.

Although the example hash function operates on numerical inputs and generates a hash value that is smaller number than the input value, a hash function can be applied to non-numerical inputs, such as strings or any computer-readable data. A hash function may produce a hash that is larger, smaller, or the same size as the input value.

Different hash functions may have different properties. For example, a hash function may be configured to produce hash values that are all the same length, regardless of the length of the input(s). A hash function may be configured to have one or more of the following properties:

- the hash function generates hash values that are unlikely to produce collisions over one or more input domains, such as a set of possible passwords and/or salts, which are described in greater detail hereinafter;
- the hash function generates hash values over a small range, resulting in intentional collisions;
- the hash function generates hash values over a range with a uniform distribution;
- the hash function has one or more other properties.

A cryptographic hash function is a one-way function that is fast to compute but infeasible to reverse other than by trying each potential message, known as a brute-force search. As computing technology improves, the time to reverse a hash value generated by a cryptographic hash function by brute force decreases. Some examples of cryptographic hash functions include MD5, SHA-0, SHA-1, SHA-2, SHA-3, other SHA variants.

Salt

A "salt" is an additional parameter that is used as additional input to a hash function in addition to the input value to be hashed. A "salted hash" or "salted hash value" is a hash value generated by a hash function based on the input value and one or more salts—that is, one or more additional parameters that are used as additional input into the hash function.

For purposes of illustrating a clear example, assume the same hash function is applied to an input value x and a salt y as parameters, where the hash function is applied to x+y. Accordingly, if the input value is 85 and the salt is 2, then the hash function will produce a hash value of six: h(85+2)=h(87)=87% 9=6. The same hash function may produce a different hash value for the same input value if a different salt is used. Continuing with the previous example, if the salt is 4 rather than 2, then the same hash function will produce a value of eight: h(85+4)=h(89)=89% 9=8.

Credentials

Websites want to protect their accounts, and accordingly, each account's credentials. A credential may include a set of fields, such as a unique username and password for each account. A username may include any field for data usable to identify the account, and the password may be any field for data usable to authenticate the account associated with the username.

Storing credentials involves security risks. For example, if an attacker gains access to a website's credential data, the attacker will have access to all the accounts on the website. To neutralize the risk of storing credentials that can be spilled, a website may use or store at least a portion of the credential as a hashed credential. As used herein, the term "hashed credential" refers to a hash value generated by applying a hash function to at least a portion of a credential. For example, when applying a hash function to a password of a credential generates a hashed credential. Hashed credentials include hashed credentials that are generated by applying a hash function to an input value and one or more salts. The input value includes at least a portion of a credential, such as a password. To authenticate a user that visits the website, the website's login page may accept a credential, hash at least a portion of the credential, and compare the hashed credential with the stored hashed credential.

As noted above, a spilled credential is a credential that is acquired by an attacker or other unauthorized party. Spilled credentials may include both published spilled credentials and credentials that are not published. Spilled credentials may also include spilled hashed credentials (that is, hashed credentials that are acquired by an attacker or other unauthorized party).

Attackers can use a brute force attack against a hashed credential to determine the original credentials. For example, an attacker can determine a password from a hashed password associated with an account using brute force methods when the hash function is known. An attacker does not need access all the hashed passwords for all of a website's accounts to use a brute force attack against a hashed credential. Accordingly, if a website stores a subset of the hashed credentials on each storage device among a set of multiple storage devices and an attacker gets access to a single storage device in the set of storage devices, then the attacker can use a brute force attack against each hashed credential on the accessed storage device.

Many websites store hashed credentials generated using proprietary values, parameters, or algorithms and not the actual credential that the account holder uses to login to the website. For example, in addition to an input value, a hash function may generate a hash based further on or one or more salts.

As discussed further herein, two hashes of the same credential can be different. For example, a user may reuse the same username and password for two different websites, but the websites may each generate and store a different hashed password because the websites each use a different salt. Spilled credentials are often spilled hashed credentials, since an attacker that gains access to a website's stored user data would most easily obtain the stored hashed credentials. Thus, if a website tries to determine whether credentials for the website match known spilled credentials for another website, the website may be unable to determine whether its credential matches any of the known spilled credentials for the other website, such as when the other website uses one or more different and/or proprietary salts.

An attacker can determine a password from a hashed password associated with an account using computationally intensive brute force methods when the hash function is known, even if the hashed password is salted. The attacker can then use the spilled credential to attempt to gain access to accounts on different websites. While an attacker can cause damage by using brute force methods on a single hashed password, a website would need to apply the same methods to large sets of published spilled credentials for other websites in order to use them effectively, which is generally computationally infeasible.

System Overview

FIG. 1 illustrates a computer system for secure detection and management of spilled credentials in an example embodiment. System 100 includes one or more client computers 102, one or more security computers 104 and one or more enterprise website computers 106. Client computer/s 102 access content published by enterprise website computer/s 106 over a network. For example, client computer/s 102 may include a browser that executes web code and/or otherwise displays content provided by enterprise website computer/s 106.

Enterprise website computer/s 106 are server computers of one or more websites. Enterprise website computer/s 106 may each receive requests for content or other data from users of the one or more websites. A request is initiated at a particular client computer 102, and may be received at a particular enterprise website computer 106 from a particular client computer 102 or a particular security computer 104. Enterprise website computer/s 106 respond to requests by sending data to the client computer that initiated the request. The data sent from the enterprise website computer/s 106 may include instructions, such as HTML, JavaScript, and CSS instructions or code that may be executed in a browser on a client computer 102.

Client computer/s 102 are communicatively coupled to security computer/s 104 and enterprise website computer/s 106 over one or more networks 160, which may include one or more local area networks (LAN) and/or one or more wide area networks (WAN) such as the Internet. As described in greater detail hereinafter, the techniques described herein may be performed on different network topologies involving client computer/s 102, security computer/s 104, and enterprise website computer/s 106. FIG. 1 illustrates lines that indicate authorized connections over network/s 160 between entities of the example embodiment shown in FIG. 1.

Security Computer

System 100 also includes one or more security computers 104. Security computer/s 104 are configured to apply one or more security techniques to protect communications between client computer/s 102 and one or more enterprise website computers 106.

Security computer/s 104 may include credential evaluation module 108 and attack detection module 110. Attack detection module 110 determines whether a request is part of an attack. Credential evaluation module 108 interacts with spilled credential management system 150 to help detect and manage a set of spilled credentials. The functionality of credential evaluation module 108 and attack detection module 110 shall be described in greater detail hereinafter.

In FIG. 1, credential evaluation module 108 and attack detection module 110 are illustrated as being executed or stored on the same one or more computers. However, at least a portion of credential evaluation module 108 and/or attack detection module 110 may be executed and/or stored on different computers. Furthermore, although credential evaluation module 108 and attack detection module 110 are illustrated as distinct in FIG. 1, one or more of credential evaluation module 108 and attack detection module 110 may be logically and/or physically integrated.

Attack Detection Module

Attack detection module 108 determines whether requests from client computer/s 102 to enterprise website computer/s 106 are part of an attack. For example, a security computer 104 may receive a request from a client computer 102 to an enterprise website computer 106 before the request is received by the intended enterprise website computer 106. Alternatively and/or in addition, a security computer 104 may receive the request from the intended enterprise website computer 106 after the intended enterprise website computer 106 receives the request from the client computer 102.

There are many ways that attack detection module 108 may determine that a request is part of an attack, such as, but not limited to determining that the request is in a series of requests that matches a known pattern for an attack, the request is from a client computer 102 known to be compromised, or any other method for identifying an attack. Some methods of determining whether a request is a part of an attack involve determining whether the request is using a spilled credential, such as by interacting with credential evaluation module 108.

In some embodiments, credential evaluation module 108 and attack detection module 110 have dependencies between each other while processing a particular request. For example, attack detection module 110 may perform one or more operations depending on whether credential evaluation module 108 indicates that a credential in the request is spilled, and/or credential evaluation module 108 may perform one or more operations depending on whether the request is part of an attack.

Attack detection module 108 may perform or cause performance of one or more actions in response to determining that a request is part of an attack. For example, attack detection module 108 may terminate the request, transmit an indication that the request is part of an attack to a corresponding enterprise website computer 106, and/or one or more other actions.

In some embodiments, in response to attack detection module 108 determining that a request comprising a credential is part of an attack, a security server 104 sends an indication that the credential is part of an attack to spilled credential management system 150. The indication may be sent by credential evaluation module 108, as shall be described in greater detail hereinafter.

Credential Evaluation Module

Credential evaluation module 108 processes credentials for one or more websites that are received in requests from the client computer/s 102. One function performed by credential evaluation module 108 is to interact with spilled credential management system 150 to help detect and manage spilled credentials for the one or more enterprise website computers. The interactions between credential evaluation module 108 and spilled credential management system 150 are described in greater detail hereinafter.

One or more of the requests received by security computers 104 may include a credential, such as a username and a password to log in to a website. For example, a particular request from a client computer 102 to an enterprise website computer 106 may be a login request that includes a candidate credential comprising a username and a password. In some embodiments, credential evaluation module 108 receives a response from spilled credential management system 150 indicating that the candidate credential is a spilled credential. In this case, security computer/s 104 may perform an action on the request it is processing in response to the indication that particular candidate credentials are spilled credentials.

In some embodiments, credential evaluation module 108 does not receive indications from spilled credential management system 150 that particular candidate credentials are spilled credentials. In this case, security computer/s will process the request without the information generated by spilled credential management system 150 regarding whether a particular credential in the request is a spilled credential. However, spilled credential management system 150 may perform other actions that allow security computer/s 104 to improve protection against attacks based on spilled credentials, as described in greater detail hereinafter.

Spilled Credential Management System

Spilled credential management system 150 detects and manages a set of spilled credentials. Spilled credential management system 150 includes salt database 114, set model database 116, and results database 118. Spilled credential management system 150 may also include one or more servers and/or computers configured to maintain salt database 114, set model database 116, and results database 118. Salt database 114, set model database 116, and results database 118 are described in greater detail hereinafter.

As used herein, the term "database" refers to one or more data stores for at least one set of data. The data store may include one or more tangible and/or virtual data storage locations, which may or may not be physically co-located. A simple example of a database is a text file used to store information about a set of data. Another example of a database is one or more data stores that are maintained by a server. Clients may access the database by submitting requests to the server that cause the database server to perform operations on the database. In some embodiments, the server is a server in a database management system (DBMS).

As used herein, the term "maintain" refers to performing operations on one or more sets of data stored in a database, such as, but not limited to accessing the database, adding data to the database, removing data from the database, modifying data in the database, searching the database, retrieving data from the database, logging events related to set/s of data stored in the database, communicating with clients to provide access to the database, and/or other operations related to the database that is maintained.

Using a Set Model to Represent a Set of Credentials

A model represents an object without including the contents of the object. For example, a hash of the object represents the object without including its contents. Likewise, a checksum generated based on the contents of a text file can represent the text file, but does not include any text of the text file.

A "set model" is a model that is configured to represent a set of objects. For example, a set model may represent a set of two or more credentials. In some embodiments, a set model represents a set of two or more hashed credentials. Just as a checksum need not include any text of a text file that the checksum represents, a set model need not include any of the objects in the set of objects that it represents.

A set model may be trained to represent the objects in a set of objects. Training may include processing each object of the set of objects and updating the set model so that the set model represents the object. After training, the set model may then be used to test for membership without storing any of the objects in the set of objects. When a new object is added to the set model, the set model is updated such that the new object is also represented in the set model. In this case, the set of objects represented in the set model also includes the new object, and the set model is trained to represent the new object. Updating the set model does not necessarily require modification of the set model. For example, an object may be added to the set model that is already represented in the set model because it was previously added. In some cases, the set model may happen to represent objects that are outside of the set of objects that the set model is configured to represent explicitly. That is, the set model may happen to represent objects other than objects that the set model is trained to represent. This is referred to as a collision, and is similar to the concept of a collision for hash functions. Like a hash function, the set model may be configured to minimize collisions.

Membership Test Using a Set Model

A set model can also be used to test for membership of a particular object in the set of objects represented in the set model. For example, a set model may be configured to represent a set of credentials, such as but not limited to a set of spilled credentials, without storing any of the credentials in the set of credentials. The set model may then be used to determine whether a candidate credential belongs to the set of credentials. When the set model represents a set of spilled credentials, the set model may be used to determine whether the candidate credential is one of the spilled credentials represented in the set model without requiring storage of the individual spilled credentials in the set of spilled credentials.

A membership test may use classical logic to perform a membership test. That is, the membership test returns results of TRUE or FALSE when the membership test is performed on a candidate object. In some embodiments, the set model is designed such that the set model can be used to perform a non-classical membership test with results other TRUE (is a member) or FALSE (is not a member). For example, a set model may be designed such that a membership test returns FALSE (is not a member of the represented set of objects) and UNKNOWN (may or may not be a member of the represented set of objects).

For example, when a non-classical membership test is performed on a candidate credential and a set model that is configured to represent a set of spilled credentials, the result may indicate that the candidate credential is not in the set of spilled credentials represented in the set model, or that the candidate credential may or may not be in the set of spilled credentials represented in the set model.

In some embodiments, when a set model happens to represent an object that is outside of the set of objects that the set model is explicitly configured to represent, a non-classical membership test returns an UNKNOWN result indicating that the candidate object may or may not be a member of the set of objects that the set model is explicitly configured to represent.

If a set model is represents a set of objects and does not include any of the objects in the set of objects, then an attacker cannot gain access to the objects in the set of objects by merely having access to the set model. For example, if a set model represents a set of credentials and does not include any of the credentials in the set of credentials, then an attacker cannot access the credentials in the set of credentials by merely having access to the set model. Also, for example, if a set model represents a set of hashed credentials and does not include any of the hashed credentials in the set of hashed credentials, then an attacker cannot access the hashed credentials in the set of hashed credentials by merely having access to the set model.

Set Model Database

Spilled credential management system 150 includes set model database 116. Set model database 116 stores one or more set models that are configured to represent a set of spilled credentials. In some embodiments, spilled credential management system 150 includes one or more set model servers and/or set model server computers that maintain the stored set model/s in set model database 116. For example, the set model server may perform operations such as training a set model, adding a spilled credential to the set model, performing a membership test on a spilled credential, and/or other operations related to one or more set models stored in the set model database 116.

In some embodiments, spilled credential management system 150 includes a set model server computer that is configured to maintain a set model stored in set model database 116 that represents a set of spilled credentials, such as but not limited to a set of hashed credentials.

The set model server computer that maintains set model database 116 may also be configured to perform a membership test on a hashed credential to determine whether the hashed credential is represented in the set model stored in set model database 116. Set model database 116 may store one or more set models for a plurality of websites. Thus, spilled credential management system 150 may detect the usage of a spilled credential for a first website in an attempt to log in to a second website.

In some embodiments, a component of spilled credential management system 150, such as a set model server computer, may receive a hashed credential from a security computer 104 and perform a membership test on the hashed credential to determine whether the hashed credential is represented in the set model stored in set model database 116. In response to determining that the hashed credential is represented in the set model, spilled credential management system 150 may perform additional processing on the hashed credential. For example, spilled credential management system 150 may store result data in results database 118 regarding an attempt to use a spilled credential to log in to a website.

In some embodiments, spilled credential management system 150 may notify security computer/s 104 that are associated with the corresponding request in response to determining that the hashed credential is represented in the set model. Alternatively, a set model server computer that manages set model database 116 may be configured to only receive one-way messages from security computer/s 104. This isolates set model database 116 and further secures the set of spilled credentials represented in the set model. Separations 120 and 122 illustrate the isolation of set model database 116 in some embodiments. Isolation as a security measure is described in greater detail hereinafter.

Salt Database

Spilled credential management system 150 includes salt database 114 in some embodiments. Salt database 114 may comprise any data store that can store salts for usernames of spilled credentials. That is, for a particular spilled credential represented in the set model stored in set model database 116, salt database 114 stores a particular salt that in association with a particular username of the particular spilled credential. Salt database 114 may store the association using the original username, a hashed username, or an otherwise encrypted username. In some embodiments, each username is assigned a unique salt that is stored in salt database 114.

In some embodiments, the salt database 114 stores salts in association with a hashed username. For example, the salts may be stored in a hash table with a key corresponding to hashed usernames. Thus, even if an attacker breaches multiple other security measures protecting the salt database 114, the attacker will have to brute force each individual hash key to obtain a salt corresponding to a username.

In some embodiments, the set model stored in the set model database 116 is configured to represent hashed credentials in the set of spilled credentials, where the hashed credential of each spilled credential is generated by applying a hash function to the password corresponding to a particular username and the unique salt stored in association with the particular username in salt database 114. Thus, to perform a successful membership test when the spilled credential is used in a request, the salt is accessed in order to generate the same hashed credential.

Spilled credential management system 150 may include one or more salt servers and/or salt server computers that maintain salt database 114. For example, a salt server may perform operations such as retrieving a salt for a particular username, adding an entry to the salt database 114 when a new spilled credential is detected, assigning a new salt to a username corresponding to a new spilled credential, storing a new salt in association with a username corresponding to a new spilled credential, or other operations related to maintaining salt database 114. In some embodiments, the salt for a particular username may be obtained by a security computer 104 by submitting a request to a salt server that includes the hashed username.

In some embodiments, a security computer 104 submits a request to obtain a salt for a particular username in order to generate a hashed credential that would be represented in the set model database 116 if the credential is in the set of spilled credentials corresponding to the set model. As described in greater detail hereinafter, having security computer 104 generate the hashed credential allows for isolation of set model database 116.

Membership Test Using Salt Database

In some embodiments, salt database 114 stores salts associated with usernames for each credential in the set of spilled credentials represented in the set model stored in set model database 116. This allows salt database 114 to determine whether the username in a candidate credential appears in any spilled credential in the set of spilled credentials represented in the set model. That is, if no salt is associated with the username, then the corresponding hashed credential is not represented in the set model stored in set model database 116.

The salt database 114 may include a hash table that stores salts in association with the associated hashed usernames. In this case, a fast lookup of a hashed username in a candidate credential can determine whether any credentials in the set of spilled credentials represented in the set model includes the username of the candidate credential.

In some embodiments, when a security computer 104 receives a candidate credential sent in a request, the security computer sends a salt look up request to a salt server computer that has access to salt database 114. The salt lookup request may include the candidate credential in the form of a hashed credential. The salt server computer determines whether the salt database 114 stores a salt in association with the username. When the salt database does not store any salt in association with the username, it may be inferred that the set of spilled credentials does not include the candidate credential. The salt server computer may then respond to the salt lookup request by sending an indication to the security computer 104 that the salt database 114 does not store any salt in association with the username. The security computer 104 may then determine that the candidate credential is not a spilled credential that is represented in the set model stored in set model database 116 without additional communication with the spilled credential management system 150.

Results Database

In some embodiments, spilled credential management system 150 includes results database 118. Results database 118 stores result data regarding the usage of spilled credentials in requests processed by security computer/s 104. As used herein, the term "result data" refers to any data corresponding to a detected attempt to use a spilled credential to log in to a website. The result data stored for a particular attempt may include one or more of the particular website the attempt was made on, the username of the spilled credential in an encrypted or unencrypted format, the particular security computer that handled the request comprising the spilled credential, transaction information associated with the request, time information associated with the request, whether additional security issues were identified with the request such as whether the request is part of an attack as determined by attack detection module 110, whether the log in was successful, and/or other information about the particular attempt to log in to a website with a spilled credential. In some embodiments, the username is encrypted with a public key provided by a corresponding website such that only computers associated with the website can decrypt the username.

In some embodiments, spilled credential management system 150 includes one or more servers and/or server computers that maintain results database 118. In some embodiments, a set model database server that maintains the set model database 116 has access to add data regarding the usage of a spilled credential to results database 118. Alternatively, the set model database server may send a request to a results database server to add the corresponding data to results database 118. In some embodiments, the security server/s 104 pass the username encrypted with the public key of a corresponding website to a set model server that maintains set model database 116, and passes on the encrypted username to results database 118 in the case of a match. This may be performed without storing the encrypted username, thereby adding another layer of security to the encrypted username.

Providing Result Data to a Security Computer

In some embodiments, security computer/s 104 receive a response indicating whether a candidate credential is represented in the set model stored in set model database 116. When security computer/s 104 receive this indication, the security computer/s 104 may determine how to handle the incoming request in real time based on whether the candidate credential is potentially a spilled credential.

For example, in the in-line topology described in greater detail hereinafter, security computer/s 104 that receive notifications in real time may determine whether to send log in requests to enterprise website computer/s 106. In the out-of-band topology described in greater detail hereinafter, security computer/s 104 that receive notifications in real time may notify enterprise website computer/s 106 that the credential in the log in request is a spilled credential, thereby allowing the enterprise website computer/s 106 to determine how to handle the request.

Restricting Security Computer Access to Result Data

In some embodiments, access by security computer/s 104 to information stored in set model database 116 is restricted. For example, credential evaluation module 108 may send hashed credentials to a set model server with access to set model database 116 without receiving an indication regarding whether candidate credentials are represented in the set mode in real time. Thus, even if an attacker breaches multiple other security measures protecting one or more security computer/s 104, the attacker may not access the set model database 116 by causing credential evaluation module 108 to send requests to a set model server in order to retrieve information from set model database 116.

Set Model Database Isolation

Isolation measures may be used to increase security, such as by storing username data and password data separately. The isolation measures may be implemented on top of measures such as hashing, encryption, salting, or other techniques, including other techniques described herein.

In some embodiments, salt database 114 and results database 118 may store username information for spilled credentials without storing any password information. Stored usernames may be further protected by encryption using a public key provided by a website. Set model database 116 may store a set model that represents the hashed credentials, such as hashed credentials generated using a password and one or more salts, without storing any username information.

A set model may have the property that obtaining any individual object represented within the set model requires the entire set model as well as a history of changes made to the set model as the set model is updated to represent additional objects. Thus, in the unlikely event that an attacker breaches multiple other security measures protecting the spilled credentials stored in set model database 116 and obtains the entire set model, the attacker will not obtain any information regarding how the set model was created or updated.

In some embodiments, separation 120 between salt database 114 and set model database 116 further secures the set of credentials represented in the set model stored in set model database 116. One way to enforce separation 120 is to ensure that any computer and/or server of spilled credential management system 150 does not have access to both salt database 114 and set model database 116. This creates one more barrier in the case that any particular computer of spilled credential management system 150 is compromised. For example, separation 120 prevents an attacker from controlling a salt server computer with access to salt database 114 from accessing the set model database 116.

In some embodiments, separation 122 between results database 118 and set model database 116 further secures the set of credentials represented in the set model stored in set model database 116. One way to enforce separation 122 is to ensure that any computer and/or server of spilled credential management system 150 does not have read access to both results database 118 and set model database 116.

In some embodiments, a component of security computer/s 104, such as credential evaluation module 108, obtains a salt for the username of a candidate credential from a salt server computer with access to salt database 114 but not set model database 116. Credential evaluation module 108 then generates a hashed credential based on the salt and the password of the candidate credential. Credential evaluation module 108 sends the hashed credential to a set model server computer with access to set model database 116 but not salt database 114. The set model server computer is then able to perform a membership test that determines whether the candidate credential is a spilled credential. Thus, security computer/s 104 are able to provide the necessary credential data to spilled credential management system 150 even with separation 120 and separation 122.

Providing Result Data to a Website

A component of spilled credential management system 150, such as a results server and/or a results server computer, may make result data available to one or more websites. In some embodiments, one or more admin server computers 124 are configured to serve data stored in results database 118 to one or more enterprise admin computers 126. Admin server computer/s 124 may reside on the same local area network (LAN) or a different LAN as spilled credential management system 150. An administrator of a website may use an enterprise admin computer 126 to access result data corresponding to the website by requesting the data from admin server computer/s 124.

The website may then use the result data to improve security of the website. For example, a website may use the result data to identify user accounts that are potentially compromised and implement remedial measures. In some embodiments, when a website obtains result data indicating that a login attempt to a particular account was made using a spilled password, the website may reset the password for the particular account, require second factor authentication, and/or take one or more other actions to protect the particular account so that authorized users of the account can secure the account from future unauthorized access.

In some embodiments, result data includes one or more modified or unmodified values of a candidate credential, such as an encrypted username. For example, the encrypted username may be encrypted using a public key provided by a website, such as by enterprise website computer/s 106. Thus, the username is protected in results database 118 and when result data comprising the username is transmitted over one or more network/s 160. Enterprise website computer/s 106 may then decrypt encrypted username with the corresponding private key.

Identifying Spilled Credentials not Represented in the Set Model

In some embodiments, spilled credential management system 150 is configured to add new spilled credentials that are detected in requests from a client computer 102. For example, a component of security computer/s 104, such as attack detection module 108, may determine that a request is part of an attack and send an indication to spilled credential management system 150 that a particular candidate credential was received in a request that is part of an attack. The spilled credential management system 150 may use the indication to determine that the particular candidate credential should be added to the set of spilled credentials represented in the set model stored in set model database 116. In some embodiments, spilled credential management system 150 may receive instructions to add one or more candidate credentials to the set of spilled credentials based on other reasons besides receiving the credential in a request that is part of an attack. Thus, examples described herein related to credentials that are received in a request that is part of an attack may also apply more generally to an indication that a credential should be added.

Adding a New Spilled Credential to the Salt Database

In some embodiments, attack module 110 determines that a request that includes a candidate credential is part of an attack. In response, when credential evaluation module 108 sends a credential lookup request comprising the username, credential evaluation module 108 includes an indication that the candidate credential was received in a request belongs to an attack. The credential lookup request may be received by a salt server that determines whether a salt is stored in association with the username in salt database 114.

The salt server then determines if a salt is stored in association with the username in salt database 114. When salt database 114 includes a salt stored in association with the username, the salt database server responds to the salt lookup request by transmitting the salt to credential evaluation module 108. Otherwise, the salt server generates a salt to associate with the username and stores the salt in association with the username in salt database 114. In some embodiments, the salt server determines whether the credential is a valid credential before performing any actions to add the username to the salt database. This prevents the addition of non-functional credentials to the set of spilled credentials.

Adding a New Spilled Credential to the Set Model Database

In some embodiments, when a candidate credential is part of an attack, credential evaluation module 108 uses a salt received from spilled credential management system 150 to generate a hashed credential based on the password of the credential and the salt. When credential evaluation module 108 sends the hashed credential to spilled credential management system 150, the credential evaluation module 108 includes an indication that the candidate credential was received in a request that is part of an attack.

A set model server of the spilled credential management system 150 performs a membership test to determine whether the hashed credential is represented in the set model stored in set model database 116. When the hashed credential is not represented in the set model, the set model server updates the set model such that the hashed credential is represented in the set model.

Omitting Flagged Passwords from the Set Model

In some embodiments, flagged passwords are omitted from the set model. For example, a system may consider a set of flagged passwords as inherently unsafe, such as a set of very common passwords. For example, accounts protected by very common passwords such as "user", "root", "password", "12345768" and the like may be easily broken into by a malicious entity.

An example of a set of flagged passwords include the top 100 most common passwords, which may be determined by analysis of a plurality of logins or obtained from a third party. Such a system may provide a different means for handling such inherently unsafe passwords and omit such passwords from the set model stored in set model database 116.

In some embodiments, when a user logs in, the credentials are checked to see if they include a password in the set of flagged passwords. If the credentials include a password in the set of flagged passwords, then a remedial action is immediately performed (e.g. resetting the password). For example, the user may be issued a warning regarding the inherently unsafe password and prevented from using a password in the set of flagged passwords. Thus, the remedial action is performed regardless of whether the credential is represented in the set of spilled credentials represented in the set model.

In some embodiments, when a detected attack includes credentials that include a password in the set of flagged passwords, the set model is not updated to represent the credential even though the credential is used as part of an attack.

Example Spilled Credential Detection in an in-Line Topology

Figure 2:
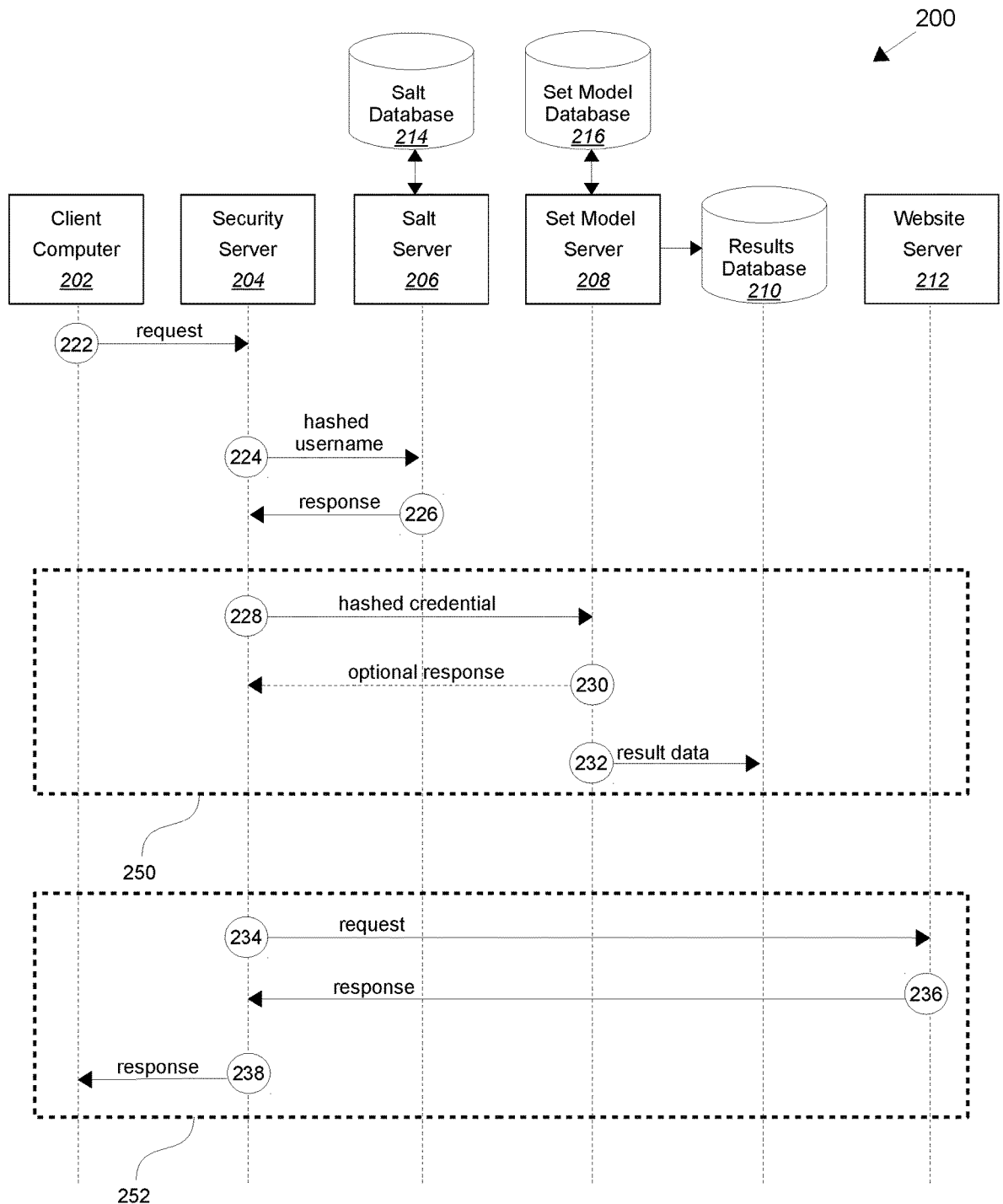
FIG. 2 is an activity diagram of a process for detecting and managing spilled credentials in an example embodiment that utilizes an in-line security server.

FIG. 2 is an activity diagram of a process for detecting and managing spilled credentials in an example embodiment that utilizes an in-line security server. Process 200 is performed within a system comprising components that are communicatively coupled over one or more networks. The system includes client computer 202, security server 204, salt server 206 with access to salt database 214, set model server 208 with access to set model database 216 and one-way access to results database 210, and website server 212. Security server 204 is positioned in the network as an in-line device. In the in-line security server configuration, requests from client computer 202 are transmitted to security server 204, which forwards requests for processing by web server 212 after applying one or more security techniques.

At step 222, client computer 202 transmits a request to security server 204. The request includes a candidate credential. At step 224, security server 204 hashes the username of the candidate credential and sends, to salt server 206, a salt lookup request including the hashed username. At step 226, salt server 206 determines whether a salt is stored in association with the username in salt database 214 and sends a response to security server 204. The response includes the salt stored in association with the username, or an indication that no salt is stored in association with the username.

Group 250 includes steps 228-232, which are performed when a salt is stored in association with the username. At step 228, security server 204 generates a hashed credential based on the password of the candidate credential and the salt received from salt server 206, and sends the hashed credential to set model server 208. Set model server 208 performs a membership test to determine whether the hashed credential is represented in the set model stored in set model database 116. In some embodiments, at optional step 230, set model server 208 provides a response to security server 204 indicating whether the credential is a spilled credential that is represented in the set model. At step 232, set model server 208 causes result data to be stored in results database 210 when the set model is represented in the salt model.

Group 252 includes steps 234-238. At step 234, the request from client computer 202 is forwarded to website server 212. At step 236, website server 212 sends a response to the client request to security server 204. At step 238, security server 204 forwards the response from website server 212 to client computer 202. The steps of group 252 may not be performed under certain circumstances, such as when security server 204 determines that the request sent by client computer 202 at step 222 is part of an attack.

Example Spilled Credential Detection in an Out-of-Band Topology

Figure 3:
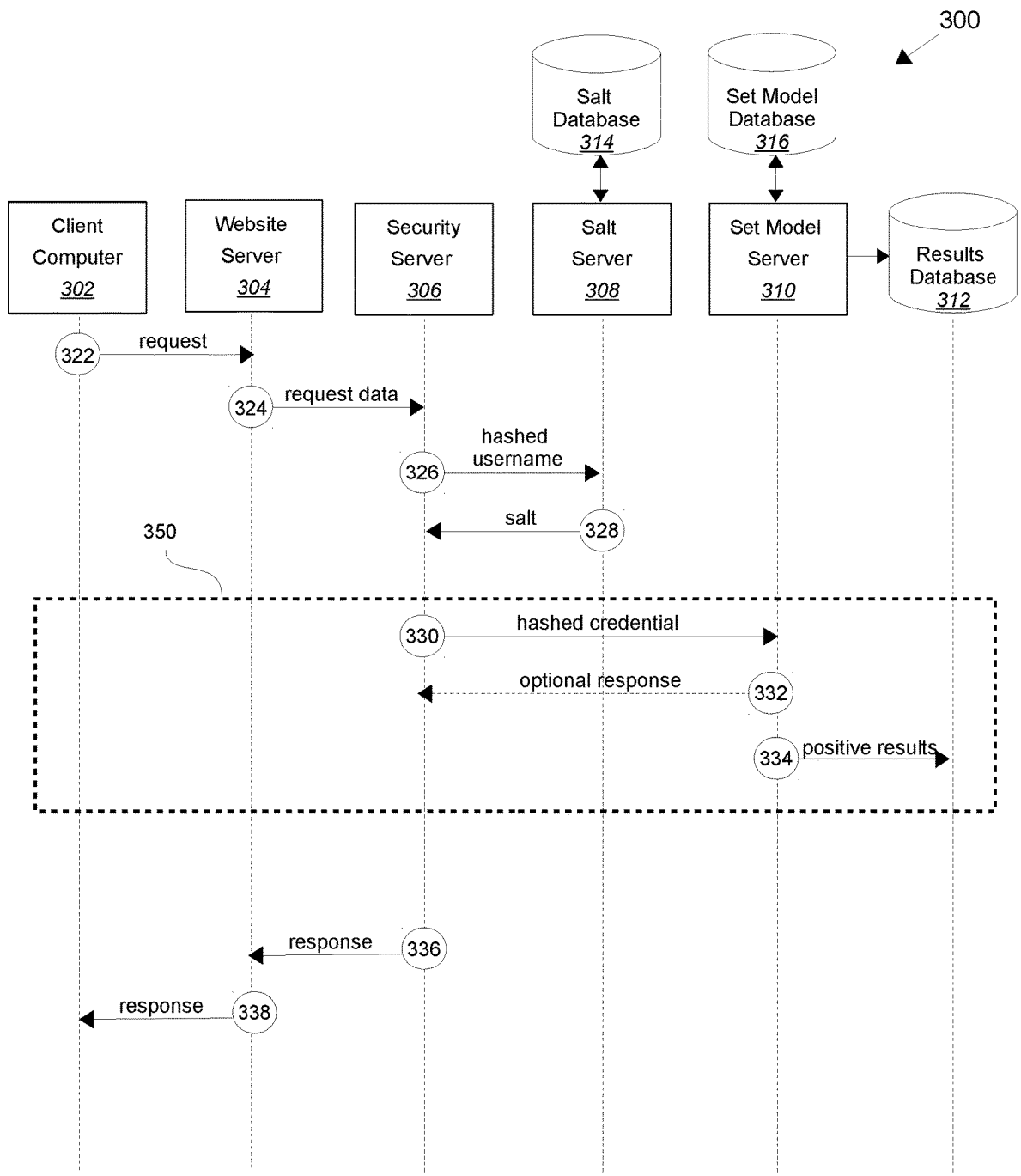
FIG. 3 is an activity diagram of a process for detecting and managing spilled credentials in an example embodiment that utilizes an out-of-band security server.

FIG. 3 is an activity diagram of a process for detecting and managing spilled credentials in an example embodiment that utilizes an out-of-band security server. Process 300 is performed within a system comprising components that are communicatively coupled over one or more networks. The system includes client computer 302, website server 304, security server 306, salt server 308 with access to salt database 314, and set model server 310 with access to set model database 316 and one-way access to results database 312. Security server 306 is positioned in the network as an out-of-band device. In the out-of-band security server configuration, requests from client computer 302 are transmitted to website server 304, which communicates with security server 306 to have one or more security techniques applied to the requests before processing the requests.

At step 322, client computer 302 transmits a request to website server 304. The request includes a candidate credential. At step 324, website server 304 forwards at least a portion of the request to security server 306. At step 326, security server 306 hashes the username of the candidate credential and sends the hashed username to salt server 308. At step 328, salt server 308 determines whether a salt is stored in association with the username in salt database 314 and sends a response to security server 306. The response includes the salt stored in association with the username, or an indication that no salt is stored in association with the username in salt database 314.

Group 350 includes steps 330-334, which are performed when a salt is found. At step 330, security server 306 generates a hashed credential based on the password of the candidate credential and the salt stored in association with the username in the salt database 314, and sends the hashed credential to set model server 310. Set model server 310 performs a membership test to determine whether the hashed credential is represented in the set model stored in set model database 316. In some embodiments, at optional step 332, set model server 310 provides a response to security server 306 indicating whether the credential is a spilled credential that is represented in the set model. At step 334, set model server 310 causes result data to be stored in results database 312 when the set model is represented in the salt model. At step 336, the security server 306 provides a response to website server 304 regarding security of the client request. At step 338, website server 304 sends a response to the request from client computer 302. If the response at step 336 indicates that there is a security issue, which may or may not include information about the candidate credential being a spilled credential, then website server 304 may determine not to perform step 338.

Example Process

Figure 4:
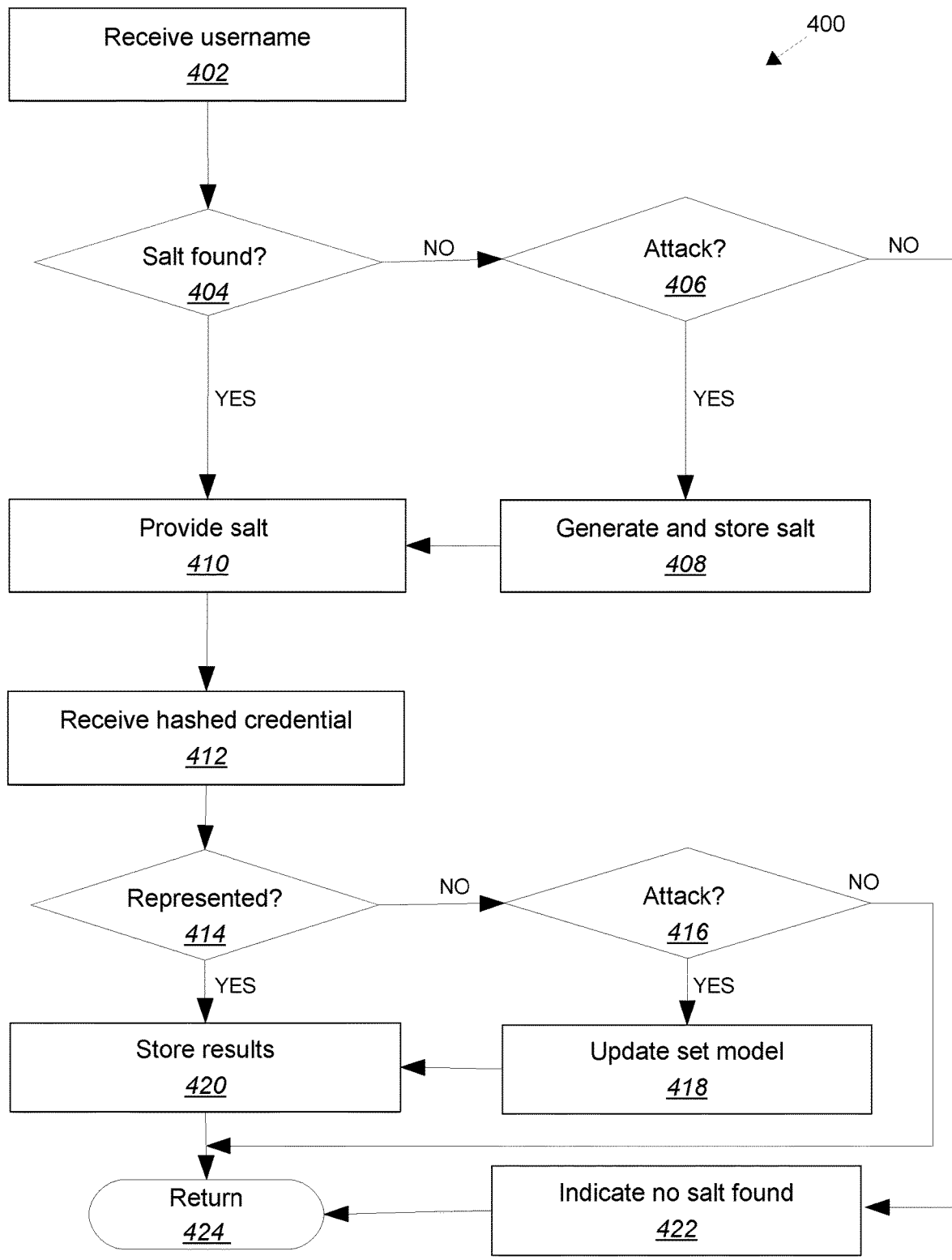
FIG. 4 is a flow diagram of a process for detecting and managing spilled credentials in an example embodiment.

FIG. 4 is a flow diagram of a process for detecting and managing spilled credentials in an example embodiment. Process 400 may be performed by one or more computing devices and/or processes thereof. For example, one or more blocks of process 400 may be performed by one or more computer systems 500. In one embodiment, one or more blocks of process 400 are performed by a spilled credential management system. That is, one or more blocks are performed by one or more computers of a spilled credential management system. Process 400 will be described with respect to spilled credential management system 150, but is not limited to performance by spilled credential management system 150.

At block 402, spilled credential management system 150 receives a username, such as but not limited to a hashed username. The username is part of a candidate credential in a request to authenticate a user. The username may be included in a salt lookup request from a security computer that received the request from a client computer.

At block 404, spilled credential management system 150 determines whether a salt database includes a salt stored in association with the username. The salt database includes salts for usernames of credentials in a set of spilled credentials that are represented in a set model. When it is determined that a salt is stored in the salt database, processing continues to block 410. Otherwise processing continues to decision block 406.

At decision block 406, spilled credential management system 150 determines if the candidate credential was sent in a request that is part of an attack. For example, a security computer that submitted a salt lookup request comprising the username may also provide an indication that the request is part of an attack. When spilled credential management system 150 determines that the candidate credential was sent not in a request that is part of an attack, processing continues to block 422.

At block 422, the spilled credential management system 150 responds to the salt lookup request with an indication that the username is not in the salt database. The recipient, such as a security computer, may infer that spilled credential management system 150 has not learned any spilled credential that includes the username, and thus the candidate credential is not a spilled credential.

Returning to decision block 406, when spilled credential management system 150 determines that the candidate credential was sent in a request that is part of an attack, processing continues to block 408.

At block 408, spilled credential management system 150 generates a salt to associate with the username and stores an association between the username and the salt in the salt database. When the request is part of an attack, the spilled credential management system 150 may determine that the candidate credential is a spilled credential by virtue of being included in the attack, and may consequently add the username to the salt database.

At block 410, spilled credential management system 150 provides the salt associated with the username in response to the salt lookup request. For example, spilled credential management system 150 may provide the salt to a security computer that sent the salt lookup request.

In some embodiments, blocks 402-410 and 422 are performed by a salt server computer and/or salt server of spilled credential management system 150 that has access to a salt database 114 but does not have access to a set model database 116.

At block 412, spilled credential management system 150 receives a hashed credential. The hashed credential may be received from a security computer that generated the hashed credential by applying a hash function to the password of the candidate credential and the salt provided by spilled credential management system 150 at block 410.

At decision block 414, spilled credential management system 150 determines whether the hashed credential is represented in a set model maintained by the spilled credential management system 150. For example, the set model may be stored in a set model database such as set model database 116, and decision block 414 may be performed by a set model server computer that maintains the set model database. When spilled credential management system 150 determines that the hashed credential is represented in the set model, processing continues to block 420.

At block 420, spilled credential management system 150 stores result data regarding the usage of a spilled credential in the request. For example, spilled credential management system 150 may store the result data in a results database.

Returning to decision block 414, when spilled credential management system 150 determines that the hashed credential is not represented in the set model, processing continues to decision block 416.

At decision block 416, spilled credential management system 150 determines if the candidate credential was sent in a request that is part of an attack. When spilled credential management system 150 determines that the candidate credential was sent in a request that is not part of an attack, processing continues to block 424.

When spilled credential management system 150 determines that the candidate credential was sent in a request that is part of an attack, processing continues to block 418, where, spilled credential management system 150 updates the set model so that the set model represents the hashed credential.

In some embodiments, blocks 412-420 are performed by a set model server computer and/or set model server of spilled credential management system 150 that has access to a set model database 116 but does not have access to a salt database 114.

At block 424, process 400 returns and/or terminates. For example, process 400 may pass control to a calling process, generate any appropriate record or notification, return after a method or function invocation, process another candidate credential, or terminate.

Implementation Mechanisms—Hardware Overview

According to one embodiment, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 5:
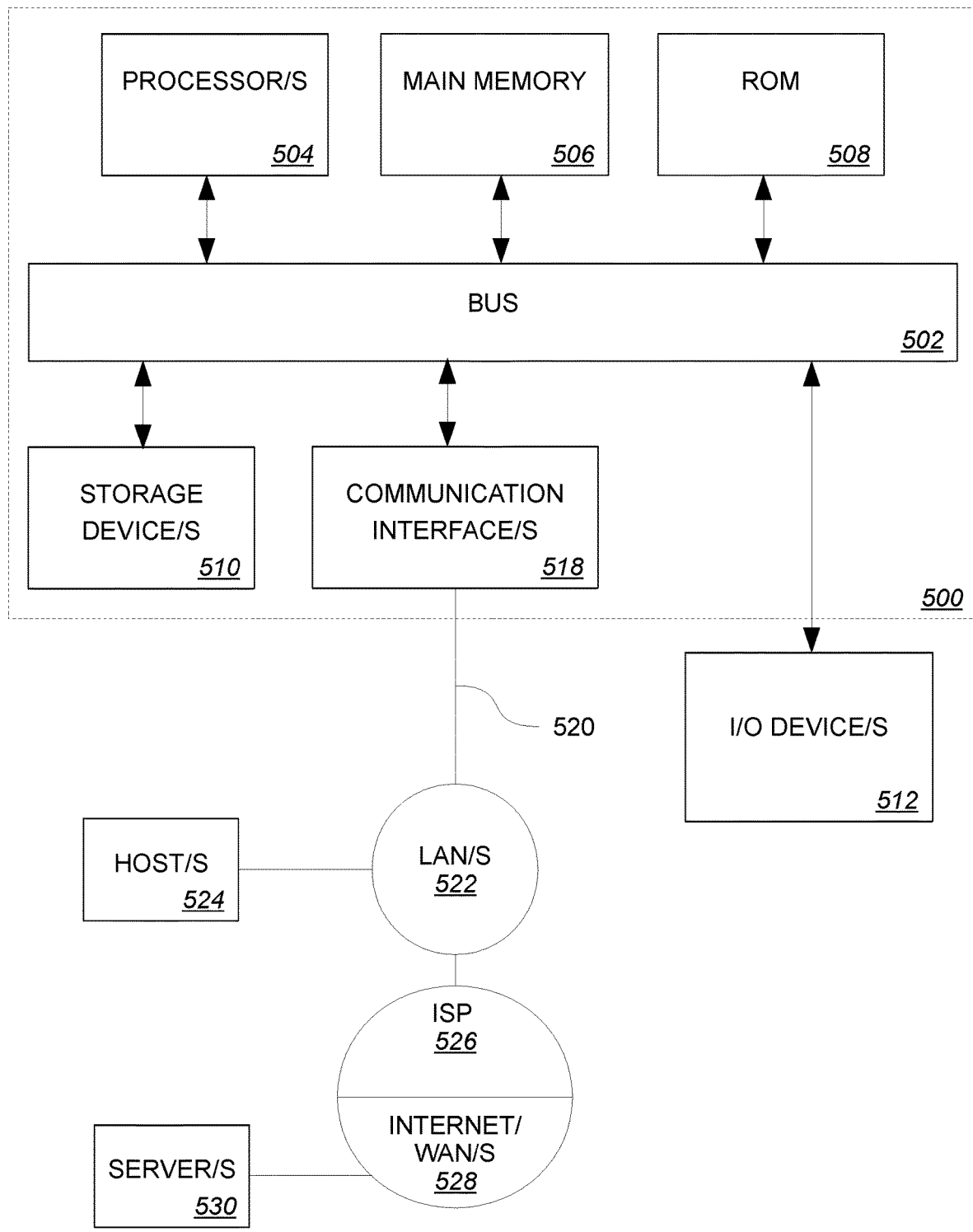
FIG. 5 illustrates a computer system upon which an embodiment may be implemented.

For example, FIG. 5 is a block diagram that illustrates a computer system 500 upon which an embodiment of the invention may be implemented. Computer system 500 includes a bus 502 or another communication mechanism for communicating information, and one or more hardware processors 504 coupled with bus 502 for processing information, such as basic computer instructions and data. Hardware processor/s 504 may include, for example, one or more, graphical processing units (GPUs), coprocessors, central processing units (CPUs), other general-purpose microprocessors, and/or other hardware processing units.

Computer system 500 also includes one or more units of main memory 506 coupled to bus 502, such as random access memory (RAM) or other dynamic storage, for storing information and instructions to be executed by processor/s 504. Main memory 506 may also be used for storing temporary variables or other intermediate information during execution of instructions to be executed by processor/s 504. Such instructions, when stored in non-transitory storage media accessible to processor/s 504, turn computer system 500 into a special-purpose machine that is customized to perform the operations specified in the instructions. In some embodiments, main memory 506 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

Computer system 500 may further include one or more units of read-only memory (ROM) 508 or other static storage coupled to bus 502 for storing information and instructions for processor/s 504 that are either static or static in normal operation but reprogrammable. For example, ROM 508 may store firmware for computer system 500. ROM 508 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 510, such as a magnetic disk or optical disk, is provided and coupled to bus 502 for storing information and/or instructions. Storage device/s 510 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid state drives, flash memory, optical disks, one or more forms of non-volatile random access-memory (NVRAM), and/or other non-volatile storage media.

Computer system 500 may be coupled via bus 502 to one or more input/output (I/O) devices 512. For example, I/O device/s 512 may include one or more displays for displaying information to a computer user, such as a cathode ray tube (CRT) display, a Liquid Crystal Display (LCD) display, a Light-Emitting Diode (LED) display, a projector, and/or any other type of display.

I/O device/s 512 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 504 and for controlling cursor movement on another I/O device (e.g. a display). This input device typically has at least two degrees of freedom in two or more axes (e.g. a first axis x, a second axis y, and optionally one or more additional axes z . . . ) that allow the device to specify positions in a corresponding coordinate system. In some embodiments, the one or more I/O device/s 512 may include a device with combined I/O functionality, such as a touch-enabled display.

Other I/O device/s 512 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information over bus 502.

Computer system 500 may implement the techniques described herein using customized hard-wired logic, one or more ASICs or FPGAs, firmware or program logic which, in combination with the computer system causes or programs, causes computer system 500 to be a special-purpose machine. According to one embodiment, the techniques herein are performed by computer system 500 in response to processor/s 504 executing one or more sequences of one or more instructions contained in main memory 506. Such instructions may be read into main memory 506 from another storage medium, such as one or more storage device/s 510. Execution of the sequences of instructions contained in main memory 506 causes processor/s 504 to perform the process steps described herein. In alternative embodiments, hard-wired circuitry may be used in place of or in combination with software instructions.

Computer system 500 also includes one or more communication interfaces 518 coupled to bus 502. Communication interface/s 518 provide two-way data communication over one or more physical or wireless network links 520 that are connected to a local network 522 and/or a wide area network (WAN), such as the Internet. For example, communication interface/s 518 may include an integrated services digital network (ISDN) card, cable modem, satellite modem, or a modem to provide a data communication connection to a corresponding type of telephone line. Alternatively and/or in addition, communication interface/s 518 may include one or more of: a local area network (LAN) device that provides a data communication connection to a compatible local network 522; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network to access a wide area network (WAN, such as the Internet 528); and other networking devices that establish a communication channel between computer system 500 and one or more LANs 522 and/or WANs 528.

Network link/s 520 typically provide data communication through one or more networks to other computing devices. For example, network link/s 520 may provide a connection through one or more LANs 522 to one or more host computers 524 or to data equipment operated by an Internet Service Provider (ISP) 526. ISP 526 in turn provides connectivity to one or more WANs 528, such as the Internet. LAN/s 522 and WAN/s 528 both use electrical, electromagnetic or optical signals that carry digital data streams. The signals through the various networks and the signals on network link/s 520 and through communication interface/s 518 are example forms of transmission media, or transitory media. Transmission media can also take the form of acoustic or light waves, such as those generated during radio-wave and infra-red data communications.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise bus 502.

Computer system 500 can send messages and receive data, including program code, through the network(s), network link 520 and communication interface 518. For example, one or more servers 530 might transmit signals corresponding to data and/or instructions requested for an application program executed by computer system 500 through the Internet 528, ISP 526, local network 522 and a communication interface 518. The received signals may include instructions and/or information for execution and/or processing by processor/s 504. Processor/s 504 may execute and/or process the instructions and/or information upon receiving the signals by accessing main memory 506, or at a later time by storing them and then accessing them from storage device/s 510.

OTHER ASPECTS OF DISCLOSURE

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A computer system comprising:
   one or more hardware processors;
   at least one memory coupled to the one or more hardware processors and storing one or more instructions which, when executed by the one or more hardware processors, cause the one or more hardware processors to:
      receive a first candidate credential comprising a first username and a first password, wherein the first candidate credential was sent in a first request from a first client computer to log in to a first server computer;
      obtain a first salt associated with the first username in a salt database from a salt server computer of a spilled credential management computer system with access to the salt database;

generate a first hashed credential based on the first password and the first salt; and transmit the first hashed credential to a set model server computer of the spilled credential management computer system with access to a set model database, wherein the salt server computer does not have access to the set model database and the set model server computer does not have access to the salt database and wherein the set model server computer is configured to:

maintain a set model that represents a set of spilled credentials;

determine whether the first hashed credential is represented in the set model; and in response to the determination that the first hashed credential is represented in the set model, perform additional processing on the first hashed credential.

2. The computer system of claim 1:

wherein obtaining the first salt associated with the first username comprises transmitting, to a salt server computer, a salt lookup request comprising the first username; wherein the salt server computer is configured to:

determine whether the salt database includes a salt associated with the first username; and when the salt database includes the salt associated with the first username, provide the salt associated with the first username in response to the salt lookup request.

3. The computer system of claim 2, wherein the salt lookup request comprises an encrypted version of the first username.

4. The computer system of claim 2, wherein the one or more instructions, when executed by the one or more hardware processors, cause the one or more hardware processors to:

determine that the first request is part of an attack;

wherein obtaining the first salt associated with the first username comprises transmitting, to a salt server computer, a salt lookup request comprising the first username and an indication that the first request belongs to an attack;

wherein the salt server computer is configured to:

determine whether the salt database includes a salt associated with the first username; and when the salt database does not include any salt associated with the first username:

generate a particular salt to associate with the first username;

store an association between the first username and the particular salt in the salt database; and provide the particular salt in response to the salt lookup request.

5. The computer system of claim 1, wherein the one or more instructions, when executed by the one or more hardware processors, cause the one or more hardware processors to:

determine that the first request is part of an attack; and transmit, to the set model server computer, an indication that the first request is part of an attack;

wherein the set model server computer is configured to:

in response to determining that the first hashed credential is not represented in the set model, update the set model such that the first hashed credential is represented in the set model.

6. The computer system of claim 1, wherein the one or more instructions, when executed by the one or more hardware processors, cause the one or more hardware processors to:

receive a second candidate credential comprising a second username and a second password, wherein the second candidate credential was sent in a second request from a second client computer to log in to a second server computer;

obtain a second salt associated with the second username in the salt database;

generate a second hashed credential based on the second password and the second salt; and transmit the second hashed credential to the set model server computer, wherein the set model server computer is further configured to:

determine whether the second hashed credential is represented in the set model; and in response to determining that the second hashed credential is represented in the set model, performing additional processing on the second hashed credential.

7. The computer system of claim 1, wherein the method is performed by one or more security computers positioned in a network as an in-line device between the first client computer and the first server computer.

8. The computer system of claim 1, wherein the method is performed by one or more security computers positioned in a network as an out-of-band device with respect to the first client computer and the first server computer.

9. The computer system of claim 1, wherein the one or more instructions, when executed by the one or more hardware processors, cause the one or more hardware processors to:

receive a third candidate credential comprising a third username and a third password, wherein the third candidate credential was sent in a third request from a third client computer to log in to the first server computer;

make a first determination that the third request is not part of an attack; and make a second determination that the no salt is associated with the third username;

wherein, based on the first determination and the second determination, no request based on the third candidate credential is transmitted to the set model server computer.

10. A method comprising:

receiving a first candidate credential comprising a first username and a first password, wherein the first candidate credential was sent in a first request from a first client computer to log in to a first server computer;

obtaining a first salt associated with the first username in a salt database from a salt server computer of a spilled credential management computer system with access to the salt database;

generating a first hashed credential based on the first password and the first salt; and transmitting the first hashed credential to a set model server computer of the spilled credential management computer system with access to a set model database, wherein the salt server computer does not have access to the set model database and the set model server computer does not have access to the salt database and wherein the set model server computer is configured to:

maintain the set model that represents a set of spilled credentials;

determine whether the first hashed credential is represented in the set model; and in response to the determination that the first hashed credential is represented in the set model, perform additional processing on the first hashed credential.

11. The method of claim 10, wherein obtaining the first salt associated with the first username comprises transmitting, to a salt server computer, a salt lookup request comprising the first username, wherein the salt server computer is configured to:
    determine whether the salt database includes a salt associated with the first username; and
    when the salt database includes the salt associated with the first username, provide the salt associated with the first username in response to the salt lookup request.

12. The method of claim 11, wherein the salt lookup request comprises an encrypted version of the first username.

13. The method of claim 11, further comprising:
    determining that the first request is part of an attack;
    wherein obtaining the first salt associated with the first username comprises transmitting, to a salt server computer, a salt lookup request comprising the first username and an indication that the first request belongs to an attack, wherein the salt server computer is configured to:
        determine whether the salt database includes a salt associated with the first username; and
        when the salt database does not include any salt associated with the first username:
            generate a particular salt to associate with the first username;
            store an association between the first username and the particular salt in the salt database; and
            provide the particular salt in response to the salt lookup request.

14. The method of claim 10, further comprising:
    determining that the first request is part of an attack; and
    transmitting, to the set model server computer, an indication that the first request is part of an attack;
    wherein the set model server computer is configured to:
    in response to determining that the first hashed credential is not represented in the set model, update the set model such that the first hashed credential is represented in the set model.

15. The method of claim 10 further comprising:
    receiving a second candidate credential comprising a second username and a second password, wherein the second candidate credential was sent in a second request from a second client computer to log in to a second server computer;
    obtaining a second salt associated with the second username in the salt database;
    generating a second hashed credential based on the second password and the second salt; and
    transmitting the second hashed credential to the set model server computer, wherein the set model server computer is further configured to:
        determine whether the second hashed credential is represented in the set model; and
        in response to determining that the second hashed credential is represented in the set model, performing additional processing on the second hashed credential.

16. The method of claim 10, wherein the method is performed by one or more security computers positioned in a network as an in-line device between the first client computer and the first server computer.

17. The method of claim 10, wherein the method is performed by one or more security computers positioned in a network as an out-of-band device with respect to the first client computer and the first server computer.

18. The method of claim 10, further comprising:
    receiving a third candidate credential comprising a third username and a third password, wherein the third candidate credential was sent in a third request from a third client computer to log in to the first server computer;
    making a first determination that the third request is not part of an attack; and making a second determination that the no salt is associated with the third username;
    wherein, based on the first determination and the second determination, no request based on the third candidate credential is transmitted to the set model server computer.

19. A computer system comprising:
    one or more hardware processors;
    at least one memory coupled to the one or more hardware processors and storing one or more instructions which, when executed by the one or more hardware processors, cause the one or more hardware processors to:
        provide a first salt associated with a first username provided in a first request from a first client computer to log in to a first server computer, wherein the provide the first salt is performed by a salt server computer of the computer system with access to a salt database;
        receive a first hashed credential based on a hash function, a first password associated with the username, and the first salt;
        determine whether the first hashed credential is represented in a set model, wherein the set model is generated based on a set of credentials identified as spilled credentials and wherein the receive the first hashed credential and determine whether the first hashed credential is represented in the set model is performed by a set model server computer of the computer system with access to the set model and wherein the salt server computer does not have access to the set model database and the set model server computer does not have access to the salt database; and
        in response to the determination that the hashed credential is represented in the set model, store data regarding the usage of the first username in the first request.

20. The computer system of claim 19, wherein providing the first salt associated with the first username comprises:
    receiving a salt lookup request comprising the first username; and
    determining whether a salt database includes a salt associated with the first username;
    wherein providing the first salt comprises providing the salt associated with the first username in response to the salt lookup request.

21. The computer system of claim 19, wherein the one or more instructions, when executed by the one or more hardware processors, cause the one or more hardware processors to:
    receive a salt lookup request comprising the first username and an indication that the first request is part of an attack;

determine whether a salt database includes a salt associated with the first username; and when it is determined that the salt database does not include a salt associated with the first username, generate a particular salt and storing an association between the first username and the particular salt in the salt database, wherein providing the first salt comprises providing the particular salt in response to the salt lookup request.

22. The computer system of claim 19, wherein the one or more instructions, when executed by the one or more hardware processors, cause the one or more hardware processors to:

receive an indication that the first request is part of an attack;

in response to determining that the first hashed credential is not represented in the set model, update the set model such that the first hashed credential is represented in the set model.

23. The computer system of claim 19, wherein the one or more instructions, when executed by the one or more hardware processors, cause the one or more hardware processors to:

provide a second salt associated with a second username provided in a second request from a second client computer to log in to a second server computer;

receive a second hashed credential based on a hash function, a second password associated with the second username, and the second salt;

determine whether the second hashed credential is represented in the set model; and in response to determining that the hashed credential is represented in the set model, store data regarding the usage of the second username in the second request.

24. The computer system of claim 19, wherein the first salt is provided to and the first hashed credential is received from one or more security computers configured to process credentials submitted from one or more client computers to one or more server computers.

25. A method comprising:

providing a first salt associated with a first username provided in a first request from a first client computer to log in to a first server computer, wherein the provide the first salt is performed by a salt server computer of a spilled credential management computer system with access to a salt database;

receiving a first hashed credential based on a hash function, a first password associated with the username, and the first salt;

determining whether the first hashed credential is represented in a set model, wherein the set model is generated based on a set of credentials identified as spilled credentials and wherein the receiving the first hashed credential and the determining whether the first hashed credential is represented in a set model is performed by a set model server computer of the spilled credential management computer system with access to the set model and wherein the salt server computer does not have access to the set model database and the set model server computer does not have access to the salt database; and in response to the determination that the hashed credential is represented in the set model, storing data regarding the usage of the first username in the first request.

26. The method of claim 25, wherein providing the first salt associated with the first username comprises:

receiving a salt lookup request comprising the first username; and determining whether a salt database includes a salt associated with the first username; wherein providing the first salt comprises providing the salt associated with the first username in response to the salt lookup request.

27. The method of claim 25, further comprising:

receiving a salt lookup request comprising the first username and an indication that the first request is part of an attack;

determining whether a salt database includes a salt associated with the first username; and when it is determined that the salt database does not include a salt associated with the first username, generating a particular salt and storing an association between the first username and the particular salt in the salt database, wherein providing the first salt comprises providing the particular salt in response to the salt lookup request.

28. The method of claim 25, further comprising:

receiving an indication that the first request is part of an attack;

in response to determining that the first hashed credential is not represented in the set model, updating the set model such that the first hashed credential is represented in the set model.

29. The method of claim 25 further comprising:

providing a second salt associated with a second username provided in a second request from a second client computer to log in to a second server computer;

receiving a second hashed credential based on a hash function, a second password associated with the second username, and the second salt;

determining whether the second hashed credential is represented in the set model; and in response to determining that the hashed credential is represented in the set model, storing data regarding the usage of the second username in the second request.

30. The method of claim 25, wherein the first salt is provided to and the first hashed credential is received from one or more security computers configured to process credentials submitted from one or more client computers to one or more server computers.

31. A non-transitory computer readable medium having stored thereon instructions comprising executable code which when executed by one or more processors, causes the processors to:

receive a first candidate credential comprising a first username and a first password, wherein the first candidate credential was sent in a first request from a first client computer to log in to a first server computer;

obtain a first salt associated with the first username in a salt database from a salt server computer of a spilled credential management computer system with access to the salt database;

generate a first hashed credential based on the first password and the first salt; and transmit the first hashed credential to a set model server computer of the spilled credential management computer system with access to a set model database to perform security processing on the first hashed credential related to the first request, wherein the salt server computer does not have access to the set model database and the set model server computer does not have access to the salt database.

32. A non-transitory computer readable medium having stored thereon instructions comprising executable code which when executed by one or more processors, causes the processors to:
provide a first salt associated with a first username provided in a first request from a first client computer to log in to a first server computer, wherein the provide the first salt is performed by a salt server computer of a spilled credential management computer system with access to a salt database;
receive a first hashed credential based on a hash function, a first password associated with the username, and the first salt;
determine whether the first hashed credential is represented in a set model, wherein the set model is generated based on a set of credentials identified as spilled credentials and wherein the receive the first hashed credential and the determine whether the first hashed credential is represented in a set model is performed by a set model server computer of the spilled credential management computer system with access to the set model and wherein the salt server computer does not have access to the set model database and the set model server computer does not have access to the salt database; and
in response to the determination that the hashed credential is represented in the set model, store data regarding the usage of the first username in the first request.

* * * * *